(12) United States Patent
Teunen

(10) Patent No.: US 7,404,087 B2
(45) Date of Patent: Jul. 22, 2008

(54) SYSTEM AND METHOD FOR PROVIDING IMPROVED CLAIMANT AUTHENTICATION

(75) Inventor: Remco Teunen, Menl Park, CA (US)

(73) Assignee: RSA Security Inc., Bedford, MA (US)

( * ) Notice: Subject to any disclaimer, the term of this patent is extended or adjusted under 35 U.S.C. 154(b) by 488 days.

(21) Appl. No.: 10/737,505

(22) Filed: Dec. 15, 2003

(65) Prior Publication Data

US 2005/0132235 A1    Jun. 16, 2005

(51) Int. Cl.
*H04L 9/00* (2006.01)
*H04L 9/32* (2006.01)
*G06F 7/04* (2006.01)

(52) U.S. Cl. .............. 713/186; 713/182; 713/183; 713/184; 713/185; 726/27; 726/28; 726/29; 726/30; 726/16; 726/17; 726/18; 726/19; 726/20; 726/21; 382/115; 382/124

(58) Field of Classification Search .......... 726/1–6, 726/16–21, 27–30; 763/182–186; 382/115–124; 713/186

See application file for complete search history.

(56) References Cited

U.S. PATENT DOCUMENTS

| | | | |
|---|---|---|---|
| 6,219,639 B1* | 4/2001 | Bakis et al. | 704/246 |
| 2003/0009333 A1* | 1/2003 | Sharma et al. | 704/246 |
| 2003/0101104 A1* | 5/2003 | Dimitrova et al. | 705/27 |

FOREIGN PATENT DOCUMENTS

EP    04813604    11/2007

OTHER PUBLICATIONS

Written Opinion of the International Searching Authority, May 2, 2006, 5 pages.
International Search Report, May 2, 2006, 3 pages.
S.H. Maes, J. Navratil, U.V. Chaudhari, "Conversational Speech Biometrics," Chapter in "Ecommerce Agents. Marketplace Solutions, Security Issues, and Supply Demand," LNAI 2033, Springer Verlag, 2001.
J-L. Dugelay et al., "Recent Advances in Biometric Person Authentication," IEEE, May 2002, pp. 4060-4063, vol. 4.
A. Kanak et al., "Joint Audio-Video Processing for Biometric Speaker Identification," IEEE, Jul. 2003, pp. 561-564, vol. 3.
R. Brunelli et al., "Person Identification Using Multiple Cues," IEEE, Oct. 1995, pp. 955-966, vol. 17, No. 10.

* cited by examiner

*Primary Examiner*—Longbit Chai

(57) ABSTRACT

A system and method are provided for improving the accuracy of speaker authentication by combining the results of multiple verification sources using statistical modeling. A statistical classifier is built on top of the underlying verification sources. The classifier combines the multiple verification inputs with associated models of the respective verification technologies underlying the verification inputs. The classifier functions to classify a claimant as a true speaker or impostor based upon the verification inputs, the model or models and, potentially, additional information related to the context in which the classifier is being used.

13 Claims, 2 Drawing Sheets

SYSTEM AND METHOD FOR PROVIDING IMPROVED CLAIMANT AUTHENTICATION

BACKGROUND OF THE INVENTION

1. Field of the Invention

The present invention relates generally to the field of claimant authentication, and more particularly to a system and method for improving the accuracy of speaker authentication by combining the results of multiple verification sources using statistical modeling.

2. Background of the Technology

The technology and business communities are continually searching for better ways to identify and authenticate people in various contexts and for various applications. A number of methods for authentication have worked their way into the marketplace, from the mundane, such as entering a personal identification number (PIN) on a keypad, to the futuristic, such as retinal scanning. Each method tends to have its own strengths and weaknesses, running the gamut from relatively insecure to relatively foolproof, and basically easy to use to the extremely cumbersome and invasive.

As technology has advanced, and continues to advance, previously impracticable methods of identification and authentication have become routine and almost ubiquitous. One such method is the use of speech and speech related applications to provide secure and non-intrusive individual authentication. Everyone with a telephone has likely encountered some form of application that has used speech to navigate a series of menu options. What the caller may or may not know is that various aspects of the call, including their actual speech, are being analyzed to determine if the caller is who they are purporting to be. A number of systems perform a portion of this analysis by using various forms of verification technology related to or used in conjunction with the caller's speech or speech characteristics. For example, there are a number of applications available in the marketplace in which a caller "enrolls" themselves by answering a number of automated or recorded questions over the telephone. The system then creates a "voiceprint" of the enrollee and uses the voiceprint in subsequent calls to verify that the voice of the subsequent caller actually matches the voice of the enrollee. This provides a non-intrusive method for a business to validate that a caller is who they say they are, and subsequently authorize access for that person to perform a particular function or use a given application.

Although there are numerous examples of such applications, one such leading application is the use of automatic speaker authentication for password reset. Companies use a substantial amount of resources to address the issue of password reset (i.e., when a person loses or forgets their password and must contact the company to reset or choose a new password). The use of speech technology essentially makes this an automated process, drastically reducing the associated costs. But with this, and in many other applications, the company wants to ensure that the accuracy of the technology being used to authenticate the caller is state of the art and, at a minimum, effective enough to provide a high degree of confidence that the caller is an authorized user.

One concept for improving the accuracy of the ultimate authentication result is to provide a system and method that combines a number of different sources of information to provide the authentication. For example, a simpler combination system for an over-the-phone application may use two verification sources to authenticate a caller: knowledge verification and voice verification. With respect to knowledge verification, the system asks the speaker one or more questions that only the speaker (or a relatively small group of potential impostors) would know. A prime example is asking the caller for their mother's maiden name. Speech recognition technology is used to analyze the caller's utterances (small instances of speech) and determine if the caller has spoken the correct name. With respect to voice verification, the characteristics of the caller's voice are compared to the caller's voiceprint (which may have been obtained during an enrollment process) to determine if there is a match. Thus, in this particular application, the system now has two distinct pieces of information, a match or no match on the mother's maiden name, and a match or no match on the voice, with which to make an authentication decision.

The difficulty is, the underlying verification technology is not perfect; and, the method of reaching the ultimate conclusion, "is the claimant who they are purporting to be", can be very complicated when using multiple sources of information. For example, making an accept/reject decision based upon the use of knowledge verification and voice verification is not as easy or straightforward as it may seem. In the instance of knowledge verification, if the application asks the claimant a number of questions, how is the authentication affected if the claimant gets one of the questions wrong? Even more pervasive, the underlying speech recognition technology employed by this exemplary system and method to understand what the claimant has said is not 100% accurate. How does one handle a situation in which the caller responds correctly, but the speech recognizer does not recognize the speech correctly? Or, in the instance of the voice verification, how does one consider and weigh the fact that the underlying technology performing the verification is not 100% accurate? How does one integrate these results into a single authentication decision taking into account the relative importance or weight of each particular input? And, it is obvious that, as more sources of information are added in an attempt to increase the accuracy of the authentication process, these problems become more cumbersome and almost insurmountable. The practicality of writing ad-hoc rules to govern each possible iteration and combination of variables as multiple verification sources are combined is questionable.

SUMMARY OF THE INVENTION

One embodiment of the present invention employs a framework for improving the accuracy of authentication systems and methods by combining the results of multiple verification sources using statistical modeling. In essence, a statistical classifier is built on top of the underlying verification sources (operating as a "meta" classifier of sorts), relegating the verification sources to function as inputs to the meta classifier. For the purposes of the following examples, the term "claimant" is used to indicate the broad category of people each of whom are claiming to be a particular person. The term "speaker" is being used to indicate a subset of claimants whose speech or speech characteristics are being used in the authentication process. The term "caller" is a subset of the speaker group indicating speakers who are providing input over a telephone.

In this embodiment, the classifier combines these inputs with a modeling of the various interfaces (the underlying verification technologies and sources), and two target claimant populations (one claimant population being "true speakers," in other words, claimants who are who they are claiming to be; the other claimant population being "impostors," in other words, claimants who are not who they are claiming to be). Depending upon the underlying verifier technology, the resulting models may be constructed independently (in the above example, providing separate population models and separate interface models), or the interface information and population information may be used to construct a single model. Fundamentally, the classifier functions to classify a claimant as a true speaker or impostor based upon the outputs of the underlying verification technologies, the model or models and, potentially, additional information related to the context in which the classifier is being used.

A main benefit of using such a meta classifier in such an improved system and method is that it relegates the decision making problem (is this a true speaker or an impostor) into a classification problem and, accordingly, decision making parameters into classification parameters. The output of the meta classifier is an accept/reject decision (accept as a true caller or reject as an impostor) which has an associated probability of error. With an appropriate classifier, complex decision making parameters, which, in the prior technology had to be governed by ad-hoc customized decision rules, are transformed into classification parameters that can be "tuned" (manipulated or optimized) more easily. Thus, a key benefit of the system and method of the preferred embodiment over any prior standard classification algorithm is the preferred embodiment's ability to decompose the classification models into orthogonal models which can be tuned independently. As a result, this system is scaleable as additional verification sources are developed and added. And, because the classifier is capable of utilizing application or user specific models and relevant context information which are independent of the underlying verification technologies, the outputs from the individual verification sources are combined in a manner which provides increased authentication accuracy above and beyond the accuracy of the underlying technologies.

BRIEF DESCRIPTION OF THE DRAWINGS

A better understanding of the present invention can be obtained when the following detailed description of an embodiment is considered in conjunction with the following drawings, in which.

Figure 1:
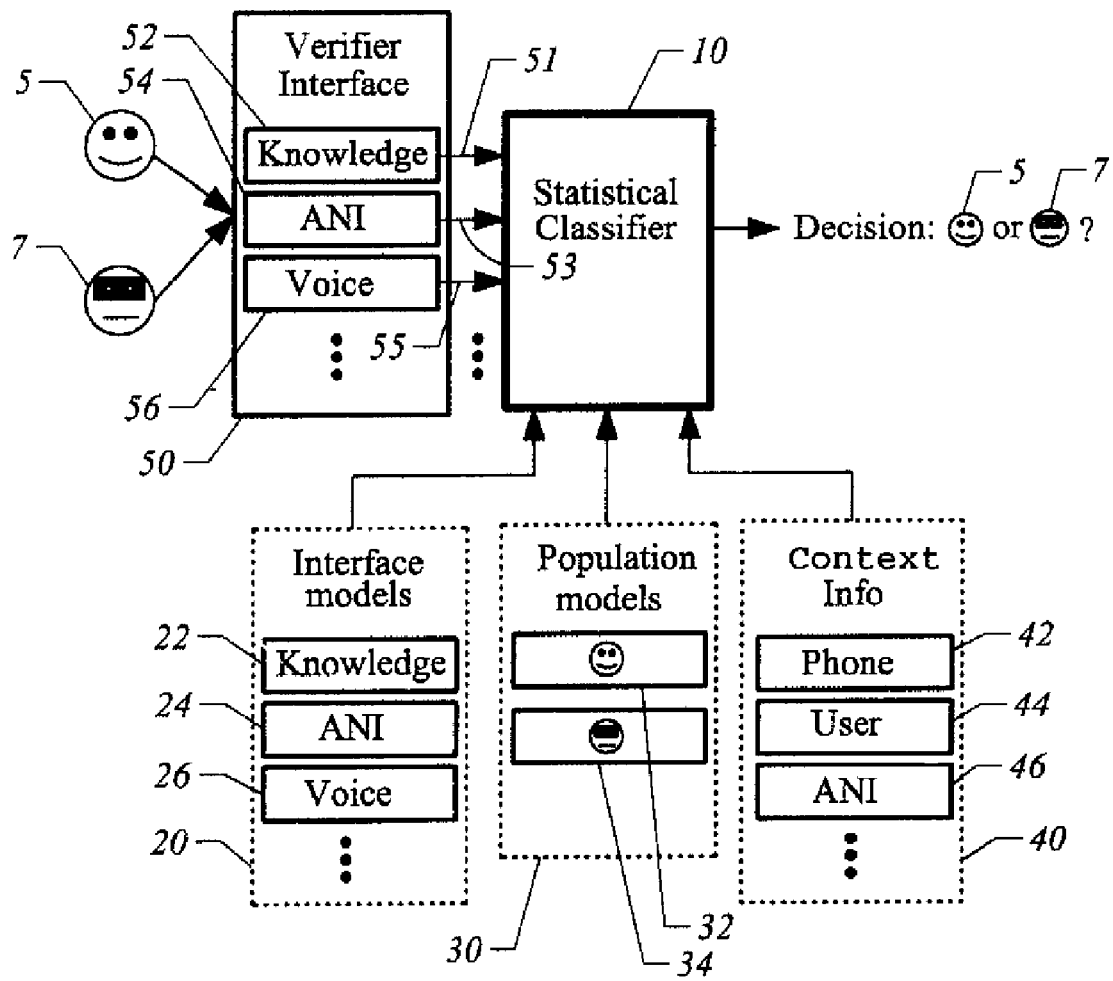
FIG. 1: shows a block diagram illustrating an embodiment of the present invention.

While the invention is susceptible to various modifications and alternative forms, specific embodiments are shown, by way of example, in the drawings and will be described in detail herein. It should be understood, however, that the drawings and associated detailed description are not intended to limit the invention to the particular form disclosed. The invention comprises all modifications, equivalents and alternatives within the spirit and scope of the presently described embodiment and as defined by the appended claims.

DETAILED DESCRIPTION OF THE PREFERRED EMBODIMENT

Referring now to FIG. 1, shown is a block diagram illustrating an embodiment of the present invention. The embodiment represented is a system for authenticating a claimant, determining whether or not a person is who they are claiming to be. If the person is who they are claiming to be, they are classified as a true speaker 5. If that person is not who they are claiming to be, they are classified as an impostor 7. At the core is a statistical classifier 10 which comprises some instantiation of a basic classification algorithm, such as a Bayes classifier. Those skilled in the art will readily recognize that other classifiers could be used or developed to achieve the desired result. At a high level, this embodiment of statistical classifier 10 utilizes two statistical model sets: an interface model set 20 and a population model set 30. Once again, those skilled in the art will readily recognize that additional model sets, existing or later developed, may be used to increase the accuracy of such a system and method. Additionally, those skilled in the art will recognize that, although depicted as separate model sets for the purposes of illustration, a single model for utilization by statistical classifier 10 may be constructed using a combination of the interface information and population information that comprises interface model set 20 and population model set 30. This is fundamentally a design choice based upon the underlying verification technology of each specific verifier employed by the system.

Interface model set 20 comprises one or more individual interface models. In FIG. 1, three individual interface models are illustrated: a knowledge model 22, an automatic number identification (ANI) model 24 and a voice model 26. "Knowledge" in this context typically refers to some form of information that is uniquely known to a particular speaker. For example, for authentication purposes, a speaker is often asked for their mother's maiden name, birth place, PIN or other identifying information. "Voice" in this context refers to a speaker's voice input in a particular application. Interface model set 20 thus comprises individual models of the various verification technologies underlying the verifier interface source inputs 51, 53 and 55 (shown in FIG. 1 and further described below) which are input into a particular embodiment of the authentication system. For each verifier source employed in the particular embodiment, there is an associated model comprising a specific probability mass function (PMF) or probability density function (PDF) which is utilized by the statistical classifier 10 to determine an overall model/probability (in this instance, whether or not a caller is a true caller 5 or impostor 7, and an associated error rate). This overall model/probability is obtained by employing the chain rule (further illustrated below in association with FIG. 2). Because the models can allow for conditional probabilities, it is thus possible to build arbitrarily sophisticated models.

Still referring to FIG. 1, shown is a verifier interface set 50 which comprises a number of individual underlying verifier technologies. Illustrated are a knowledge verifier 52, an ANI verifier 54 and a voice verifier 56. As described above, the knowledge verifier 52 typically represents some form of technology which determines if a person is a true speaker 5 or impostor 7 based upon their unique knowledge of a specific piece of information. For example, an automated system could ask a caller a number of recorded questions and employ speech recognition technology to determine what the speaker has said in reply, then determine if what was said corresponds to the correct answers. ANI verifier 54 typically comprises a system which compares a telephone number that is sent over the telephone line with an individual call to a number or numbers stored in a database. Based upon this comparison, the ANI verifier 54 can provide an authentication result or provide further useful information to statistical classifier 10 through input 53. Voice verifier 56 typically comprises a voice verification system which compares the characteristics of the speaker's voice with the voiceprint of the person that speaker is claiming to be. After the waveform is received by the voice verifier 56 and matched against the voiceprint, the system will provide a voice verification result at input 55 to statistical classifier 10. As shown in the figure, any number of individual verification technologies can be added or removed to the currently illustrated embodiment.

Population model set 30 is illustrated in FIG. 1, comprising two individual population models: true speakers model 32 and impostors model 34. In the preferred embodiment, these are models of the two speaker populations, true speakers 5 and impostors 7, empirically determined using a histogram of actual caller data that is run through each individual verification technology source (in verifier interface set 50). For example, with respect to voice verifier 56, a certain amount of data (utterances from many different speakers, both true speakers and impostors) is input into the voice verifier 56, and the output is measured. This output information is then used to construct a model (in this case, an empirically determined distribution) of impostors 7 (based on utterances from impostors) and a model of true speakers 5 (based on utterances from true speakers) for that particular verifier 56. These models are used by the statistical classifier 10 in conjunction with the other inputs to make the ultimate determination as to whether or not a caller is a true speaker 5 or impostor 7. Of course, it is also possible to use data from a single caller to construct these models or a portion thereof (for example, it is possible to construct the true caller model for an individual from utterances solely from that individual, not utterances from a number of different speakers).

Also illustrated in FIG. 1 is a context information set 40. In this particular embodiment, context information set 40 comprises phone information 42, user information 44 and ANI information 46. Phone information 42 typically comprises information relating to the type of phone that is associated with a particular number (the number having been obtained from the ANI information 46). For example, a particular number for a particular caller could be associated with that caller's home phone or cellular phone. This distinction regarding the type of phone may have a substantial impact on the accuracy of the authentication results for a given application using a specific verification technology. User information 44 typically comprises a user profile, which is a collection of information stored by the system for use in association with a particular caller. Statistical classifier 10 operates to use all of this information to further increase the accuracy of the authentication result (as further explained below).

Again, as stated above, interface model set 20, population model set 30 and context information set 40 are depicted as separate model sets in order to simplify the illustration of the present invention. Depending upon the underlying verification technology employed by the individual verifiers in verifier interface set 50, the information specified in the various model sets may be used to form separate respective models for use by statistical classifier 10 (interface models, population models and context models), or may be combined to form a single model for use by statistical classifier 10 (a single model based upon interface information and population information, for example).

For purposes of further illustration, consider a system and method employing a statistical classifier 10 that is based upon two sources, voice verifier 56 and knowledge verifier 52. Statistical classifier 10 also uses some context information from context information set 40, and, once again for purposes of this example, the system and method are being used in an over-the-phone banking application. Solely for simplicity of the models, we assume for the purposes of this illustration that each source is independent of the other sources. This means that the voice verifier 56 score of a true speaker 5 is independent of whether that speaker 5 knows the information required by the knowledge verifier 52 (for further purpose of this illustration, such information being the speaker's mother's maiden name). Note also in this example that "score" means the raw data output from the voice verifier 56 that is input into the statistical classifier 10 at input 55.

The output (input 51) of the mother's maiden name (MMN) knowledge verifier 52 is a "match"/"mismatch" value, which corresponds to whether the recognized MMN equals the MMN on file. The specification of the MMN verification source (associated with knowledge verifier 52) for the system in accordance with the present invention might look like this (in XML format):

```
<Source Id = "MothersMaidenName">
    <Model Name = "Impostors">
        <PMF>
            <Prob Value = "Match" P = "0.15" />
            <Prob Value = "Mismatch" P = "0.85" />
        </PMF>
    </Model>
    <Model Name = "TrueSpeakers">
        <PMF>
            <Prob Value = "Match" P = "0.99" />
            <Prob Value = "Mismatch" P = "0.01" />
        <PMF>
    </Model>
    <Interface>
        <Variant>
            <Distortion P_FA = "0.1" P_FR = "0.05" />
        </Variant>
        <Variant>
            <Condition IdRef = "Channel" Operator = "Equal" Value = "HandsFree" />
            <Distortion P_FA = "0.15" P_FR = "0.1" />
        </Variant>
    </Interface>
</Source>
```

The two <model> sections specify the speaker population models comprising population model set 30 (for true speakers 5 and impostors 7) associated with knowledge verifier 52. Once again, these models can easily be determined empirically. The impostors model 34 specifies that there is a 15% probability that an impostor 7 knows the MMN that corresponds to the account that they are trying to break into. Similarly, the true speakers model 32 specifies that there is a 99% probability that a true speaker 5 knows their own MMN. Because these models solely model the speaker populations, these numbers are expected to be independent of the specific verifier that is used to verify the information (given a certain instance of an application).

The <interface> section specifies the MMN knowledge verification model 22 associated with the MMN knowledge verifier 52 (i.e., the mother's maiden name speech recognizer). Knowledge verification model 22 specifies that, in general, the underlying verification technology which comprises knowledge verifier 52 has a 10% false acceptance rate, and a 5% false rejection rate. An error is a false acceptance error when the caller says the wrong MMN, but the knowledge verifier 52 recognizes the correct MMN. On the other hand, a false rejection error refers to the case in which the person says the correct MMN, but the knowledge verifier 52 misrecognizes it. The <interface> section also specifies that if the caller calls from a hands-free phone, that the recognition error rates will be higher. This information relating to the specific type of phone in current use is supplied to the statistical classifier 10 from the context information set 40.

The output of the voice verifier 56 is a score that indicates how well the voice matches the voiceprint on file. A high score means that the speaker is more likely to be the true speaker 5, and low score means that the speaker is more likely to be an impostor 7. A particular score doesn't have an absolute meaning, since the score distributions are highly dependent on application and context. The specification of the voice verification source (associated with voice verifier 56) for the system in accordance with the present invention might look like this (in XML format):

```
<Source Id = "Voice">
    <Model Name = "Impostors">
        <PDF>
            <Gaussian Mean = "–0.344466" Variance = "7.3" />
        </PDF>
    </Model>
    <Model Name = "TrueSpeakers">
        <PDF>
            <Gaussian Mean = "0.5" Variance = "5.9" />
        </PDF>
    </Model>
    <Interface>
        <Variant>
            <Distortion Scale = "1" Offset = "0" />
        </Variant>
        <Variant>
            <Condition IdRef = "EnrollGender" Operator = "Equal"
            Value = "Female" />
            <Condition IdRef = "EnrollChannel" Operator = "Equal"
            Value = "Cell" />
            <Condition IdRef = "Gender" Operator = "Equal"
            Value = "Female" />
            <Condition IdRef = "Channel" Operator = "Equal"
            Value = "Electret" />
            <Distortion Scale = "0.887837" Offset = "–0.0686042" />
        </Variant>
    </Interface>
</Source>
```

The two <model> sections specify the speaker population models comprising population model set 30' associated with voice verifier 56 (the "prime" designation is being used in this example to distinguish between the population model set 30 for the knowledge verifier 52 and the population model set 30' for the voice verifier 56). The true speakers model 32' and impostors model 34' specify the score distributions for true speakers 5 and impostors 7, respectively. In this particular case Gaussian distributions are used to accomplish this. The <interface> section specifies that the scores are distorted when there is a mismatch between enrollment channel (the manner in which the caller initially enrolled in the particular system/application) and verification channel (the manner in which the caller is currently providing input to the system/application), and the speaker is a female. Once again, this latter information is supplied to statistical classifier 10 by context information set 40.

Note that in this example, the interface information attributable to voice model 26 is actually combined with the population information attributable to population model set 30' to provide an integrated true speaker model 32' and impostor model 34' for use by statistical classifier 10. This is a design choice based upon the manner in which the population model set 30' is constructed and the inherent integration between the information represented by voice model 26 and population set 30'. The population models 32' and 34' can thus specify the error rate associated with each raw verification score from voice verifier 56 taking into account accuracy information with respect to the underlying verifier technology as used in the relevant context.

Given the result of the mother's maiden name knowledge verifier 52, the voice verifier 56, the various corresponding models from model sets 30 and 30', and context information, the statistical classifier 10 computes the likelihoods of the claimant being an impostor 7 and true speaker 5. The likelihoods of the different sources are combined by multiplication, which means that the sources are considered to be independent. Since conditional probability distributions can be specified, proper joint probability distributions can be obtained.

Note that due to the way the likelihoods are combined, the different sources are automatically weighted appropriately according to their accuracy (i.e., accuracy of distinguishing between impostors 7 and true speakers 5). Thus, the statistical classifier 10 converts the complex decision making question of "how much weight should this piece of information be given compared to that piece in this context" into the accuracy question of "how accurate is this verifier compared to that verifier in this context". The answer to the latter question is decomposed into two questions by statistical classifier 10: 1) What is the inherent accuracy of this piece of information in this context, and 2) how accurately can this piece of information be captured by the interface in this context. The <model> sections contain the answer to question 1, and the <interface> sections contain the answer to question 2. The parameters for both the model and interface sections are specific to a particular application, but in general they can be measured or estimated.

Figure 2:
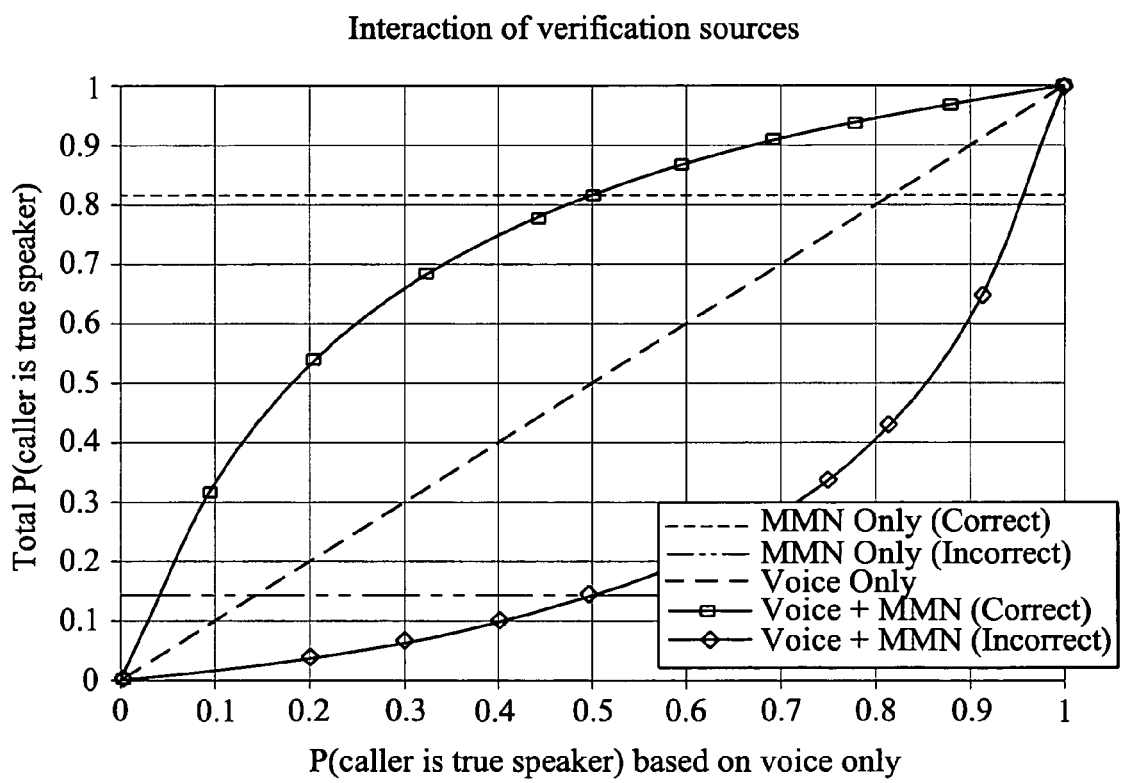
FIG. 2: shows a graphical representation of the interaction between various exemplary verification sources utilized as inputs to the authentication system of an embodiment of the present invention.

FIG. 2 shows how the output of the statistical classifier 10 (y-axis) is affected by the results of the MMN knowledge verifier 52 and voice verifier 56. These results assume that the prior probability of the caller being the true speaker 5 vs. an impostor 7 is 50%. The "MMN only" lines in the figure correspond to the output of the statistical classifier 10 when only the result of the MMN knowledge verifier 56 is taken into account (the x-axis is irrelevant). Thus, without taking any other information into account, the probability that the caller is a true speaker is 82% if the correct MMN was recognized, and 15% if an incorrect MMN was recognized. However, when the result of the MMN knowledge verifier 52 is combined with the result of the voice verifier 56, the curves change depending on the confidence (error rate) of the voice verifier 56. When the result of the voice verifier 56 does not contain any information (which is the case when the error rate of its decision is 50%, thus at the 0.5 mark on the x-axis), the output of the statistical classifier 10 corresponds to the result of the MMN knowledge verifier 52. However, as soon as the error rate of the voice verifier 56 is different from 50%, the overall result changes. If the decision of the voice verifier 56 is the same as the decision of the MMN knowledge verifier 52, the overall P (caller is true speaker 5) is higher than the individual results. For example, if the correct MMN is recognized (which means that P (caller is true speaker 5) of the MMN knowledge verifier 52 is 82% and P (caller is true speaker 5) of the voice verifier is 70%, then the combined P (caller is true speaker 5) is $$L\_true\_speaker/(L\_true\_speaker+L\_impostor),$$

where L_true_speaker, the (scaled) combined true speaker likelihood, is 82*70, and where L_impostor, the (scaled) combined impostor likelihood, is (100−82)*(100−70), resulting in $$(82*70)/\{82*70+18*30\}*100\%=91.4\%$$

This is the result of the chain rule and the independence of the sources. On the other hand, if P (caller is true speaker 5) of the MMN knowledge verifier 52 is 15%, and P (caller is true speaker 5) of the voice verifier 56 is 85%, then the combined P (caller is true speaker 5) is 50%. In other words, because the true speaker 5/impostor 7 decisions of the verifiers are different, and because the error rates of those decisions is the same (15%), they "cancel" each other out.

Importantly, the system and method described above effectively convert the decision making problem (is the caller a true speaker 5 or impostor 7) into a classification problem. The "importance" of the results of the individual verification source is based upon the accuracy of the result in a given context. And, the inherent classification accuracy of a certain piece of information is modeled separately from the interface that is used to capture the information from the speaker. Thus, statistical classifier 10 takes both into account to determine the overall accuracy of a piece of information, thus greatly increasing the accuracy of the result.

Additionally, although the preferred embodiment has been described in the context of a speech application, the system and method are equally applicable in other authentication contexts and using other verification sources. For example, any form of biometric verification (rather than solely speech) could be used as inputs to the preferred embodiment. In this instance, the underlying biometric verification technology would be modeled and the respective population and interface models would be constructed. These models would then be combined with the corresponding verifier inputs by the statistical classifier to provide an overall authentication result, with associated probability of error. Just as described in detail with respect to the preferred embodiment, this provides a system and method that substantially increases the overall accuracy of the claimant authentication.

What is claimed is:

1. An improved claimant authentication system, comprising:
   a classifier configured to accept inputs from a plurality of verifier interfaces, wherein said plurality of verifier interfaces comprises at least one voice verifier and one knowledge verifier; and
   a plurality of population model sets, each said population model set corresponding to a respective one of said plurality of verifier interfaces and comprising a first model of true speakers and a second model of impostors;
   wherein said second model of imposters corresponding to said at least one knowledge verifier comprises a probability that an imposter knows personal identity context information associated with a true speaker of said first model;
   wherein said classifier combines said inputs with said population model sets to provide a combined authentication result.

2. The system of claim 1, further comprising:
   a plurality of interface models corresponding to said plurality of verifier interfaces for providing said classifier with additional information relating to an accuracy of an underlying verification technology of said plurality of verifier interfaces, wherein said classifier combines said additional information with said inputs and said population model sets to provide a combined authentication result.

3. The system of claim 2, further comprising:
   a context information set for providing at least a first piece of information to said classifier relating to a content of said authentication system or component thereof, wherein said classifier combines said context information set with said inputs, said population model sets and said interface models to provide a combined authentication result.

4. The system of claim 1, further comprising:
   a context information set for providing at least a first piece of information to said classifier relating to a content of said authentication system or component thereof, wherein said classifier combines said context information set with said inputs and said population model sets to provide a combined authentication result.

5. An improved speaker authentication system, comprising:
   a statistical classifier configured to accept a plurality of inputs from a corresponding plurality of verifier interfaces, wherein said plurality of verifier interfaces comprises at least one voice verifier and one knowledge verifier; and
   a plurality of model sets coupled to said statistical classifier and operative to provide said statistical classifier with statistical models, wherein said statistical models are based upon information derived from an underlying verification technology corresponding to said verification interfaces;
   wherein at least two of said plurality of model sets each comprise a first model of true speakers and a second model of impostors;
   wherein said second model of imposters corresponding to said at least one knowledge verifier comprises a probability that an imposter knows personal identity context information associated with a true speaker of said first model;
   wherein said statistical classifier combines said plurality of inputs with said plurality of statistical models to provide a combined authentication result.

6. The system of claim 5, further comprising:
   a context information set coupled to said statistical classifier for providing at least a first piece of information to said statistical classifier relating to a content of said authentication system or component thereof, wherein said statistical classifier combines said first piece of information with said inputs and said plurality of statistical models to provide a combined authentication result.

7. The system of claim 5, wherein at least one of said verifier interfaces is a voice verifier and further wherein one of said plurality of model sets includes a voice verifier model based upon information derived from the underlying verification technology of said voice verifier.

8. The system of claim 7, wherein said voice verifier model is constructed using a combination of interface information and population information.

9. The system of claim 8, wherein said statistical classifier combines said plurality of inputs and said plurality of statistical models with context information to provide a combined authentication result.

10. The system of claim 9, wherein said statistical classifier is a Bayes classifier.

11. A method for improving the accuracy of claimant authentication, comprising the steps of:
   utilizing inputs from a plurality of verifier interfaces, wherein said plurality of verifier interfaces comprises at least one voice verifier and one knowledge verifier;
   utilizing a plurality of models constructed from information relating to an underlying verification technology of said plurality of verifier interfaces; and
   wherein at least two of said plurality of models each comprise a first model of true speakers and a second model of imposters; and
   wherein said second model of imposters corresponding to said at least one knowledge verifier comprises a probability that an imposter knows personal identity context information associated with a true speaker of said first model;
   combining said inputs with said plurality of models using a statistical classifier to provide a combined authentication result.

12. The method of claim 11, further comprising the step of: combining at least a first piece of information relating to a content of said authentication system or component thereof with said inputs and said plurality of models using said statistical classifier to provide said combined authentication result.

13. The method of claim 12 wherein a first of said verifier interfaces is a voice verifier and further wherein a corresponding first model from said plurality of models is a voice verifier model.

* * * * *